US 6,749,152 B2

(12) United States Patent
Bebesel et al.

(10) Patent No.: US 6,749,152 B2
(45) Date of Patent: Jun. 15, 2004

(54) METHOD AND DEVICE FOR AVOIDING A COLLISION OF A ROTATING ROTOR BLADE OF A ROTARY-WING AIRCRAFT WITH BLADE VORTEX

(75) Inventors: Marius Bebesel, Munich (DE); Reinhard Pongratz, Taufkirchen (DE); Dieter Roth, Munich (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 10/237,419

(22) Filed: Sep. 9, 2002

(65) Prior Publication Data

US 2003/0047646 A1 Mar. 13, 2003

(51) Int. Cl.[7] ................................................ B64C 27/57
(52) U.S. Cl. ................................... 244/17.13; 244/1 N
(58) Field of Search .............................. 244/1 N, 17.11, 244/17.13, 17.25, 181; 416/23

(56) References Cited

U.S. PATENT DOCUMENTS

| | | | |
|---|---|---|---|
| 6,171,056 B1 * | 1/2001 | Lorber ........................ | 416/42 |
| 6,283,406 B1 * | 9/2001 | Remington et al. ......... | 244/1 N |
| 6,311,924 B1 * | 11/2001 | Ferrer ..................... | 244/17.13 |
| 6,322,324 B1 * | 11/2001 | Kennedy et al. ............... | 416/1 |
| 6,461,106 B1 | 10/2002 | Rahier ........................... | 416/1 |
| 6,478,541 B1 * | 11/2002 | Charles et al. ................. | 416/23 |

FOREIGN PATENT DOCUMENTS

| | | |
|---|---|---|
| DE | 10022819 | 8/2001 |
| FR | 2782307 | 2/2000 |
| JP | 10038671 | 2/1998 |

OTHER PUBLICATIONS

XP-002101523, "Reduction of Helicopter Blade–Vortex Interaction Noise by Active Rotor Control Technology", Yung H. Yu et al., Prog. Aerospace Sci. vol. 33, pp. 647–687, Sep. 1997.

* cited by examiner

Primary Examiner—Robert P. Swiatek
(74) Attorney, Agent, or Firm—Davidson, Davidson & Kappel, LLC

(57) ABSTRACT

A method for avoiding a collision of a rotating rotor blade of a rotary-wing aircraft with a blade vortex, and a device for executing the method. An aerodynamic parameter of the rotor blade of a rotary-wing aircraft is controlled, (for example, variation of the angle of incidence of the blade or profile variation of the blade), using a signal processing device that includes at least one open-loop and/or closed-loop control device, in such a way that a collision of the rotor blade with blade vortices becomes avoidable. The frequency content from the signal of the sound-pressure sensors is rapidly and precisely found. The harmonics are progressively adapted. A lesser calculation requirement per step and increase accuracy, as compared with an FFT analysis, is provided.

10 Claims, 1 Drawing Sheet

METHOD AND DEVICE FOR AVOIDING A COLLISION OF A ROTATING ROTOR BLADE OF A ROTARY-WING AIRCRAFT WITH BLADE VORTEX

CROSS-REFERENCE TO RELATED APPLICATIONS

This application claims priority to German Patent Application No. 101 44 484.2, which is incorporated by reference herein.

BACKGROUND

The present invention relates to a method for avoiding a collision of a rotating rotor blade of a rotary-wing aircraft with a blade vortex, a noise signal spectrum being acquired, by means of a measuring element on the rotary-wing aircraft, and converted into electrical signals, and the electrical signals being transmitted to a signal processing device for the purpose of generating an actuating signal for a final control element on the rotor blade for the purpose of influencing aerodynamic parameters of the rotor blade.

The noise generated by the rotary-wing aircraft, particularly a helicopter, results from the superimposition of a multiplicity of acoustic sources. Such acoustic sources include, for example, the main rotor blades, the power unit, the main transmission, the rear rotor, etc. A different dominance of individual noise sources occurs for different flight phases of a helicopter. In particular, for the descent or landing phase of a helicopter, the rotating main rotor blade is the characteristic noise source.

Upon the rotation of a rotor blade, strong vortices develop at its trailing edge which roll off at the blade tip, appearing to form a "braid". A so-called "turbulent wake" is formed. The collision of a following rotor blade with a vortex from the turbulent wake is known by the term, familiar to the specialist in the art, of blade vortex interference (BVI). The abbreviated form BVI is used in the following. Following the rotating rotor blade, this vortex forms loops which, when the helicopter is flying forwards, remain below and behind the helicopter.

The situation is different in the descent or landing phase with a small or moderate descent angle. In that case, the helicopter follows each of these vortices with the result that, due to the high rotational speed, a rotor blade always impacts the vortex caused by a blade ahead of it. This impact of a rotor blade on such a vortex produces a large pressure difference. This is the cause of the noise development that is characteristic of helicopters in the descent or landing phase. Upon collision with a rotor blade, the vortices furthermore cause a spectrum of low-frequency and high-frequency variations in the angle of incidence on the rotor blade.

Efforts are being made, as part of future helicopter developments, to reduce this noise source in the descent or landing phase. Such a concept presupposes that the dynamic movement of the blade vortex interactions can be reliably known. Specific measures for noise reduction are rendered possible only by the reliable metrological acquisition, identification and location of BVI.

For the purpose of metrological acquisition of the BVI during the descent or landing phase, measuring elements for measuring air pressure were previously integrated into the rotor blades of prototype helicopters. The noise emission was derived using the variation in the air pressure.

Only with a reliable acquisition, identification and location of a state of the blade vortex interaction under the conditions suitable for serial production does it become possible to apply measures for noise reduction with promise of success. These measures are directed towards a following rotor not colliding with a blade vortex. This can be effected, for example, in that in the case of orientation by means of a swash plate, the angle of incidence of the rotor blade is varied by an actuator instead of the rigid control rod.

A different influencing of an aerodynamic parameter of the rotor blade would be possible if a flap, whose angular position could be varied by means of a final control element, were disposed on the rotor blade in the region of the blade trailing edge.

Another aerodynamic parameter could be influenced through the use of an adaptive rotor blade which could vary its profile cross-section by means of the final control element (actuator).

The signals supplied by a measuring element are transmitted to a signal processing device which represents an open-loop and/or closed-loop control device.

The final control element is controlled by the controller in such a way that an actuating action is effected, for example, through variation of the angle of incidence of the rotor blade, so that the difference between the setpoint value and the actual value decreases and thus contributes to noise reduction.

A crucial question remains that of which type and manner of signal processing is used in order to interpret a rotor blade in an aerodynamic parameter so that a collision with blade vortices can be avoided. No more extensive references relating to this were ascertained in the prior art.

SUMMARY OF THE INVENTION

An object of the present invention is to control an aerodynamic parameter (e.g. variation of the angle of incidence of the blade or profile variation of the blade) of the rotor blade of a rotary-wing aircraft, using a signal processing device that includes at least one open-loop and/or closed-loop control device, in such a way that a collision of the rotor blade with blade vortices becomes avoidable.

The present invention provides a method for avoiding a collision of a rotating rotor blade of a rotary-wing aircraft with a blade vortex, a noise signal spectrum being acquired, by means of a measuring element (7, 8) on the rotary-wing aircraft, and converted into electrical signals, and the electrical signals being transmitted to a signal processing device (1) for the purpose of generating an actuating signal for a final control element (6) on the rotor blade for the purpose of influencing aerodynamic parameters of the rotor blade, the harmonics of the blade repetition frequency being determined, in the device (2) for determining a BVI index, in the signal processing device (1), from the electrical signals representing the noise signal spectrum and a quotient being formed, as a signal characteristic quantity, from the harmonics typical of BVI and from the total harmonics, and being averaged and this signal characteristic quantity being supplied to a threshold-value device (3) and, in the case of BVI, the threshold-value device (3) signaling an exceeding of the threshold value, which starts the closed-loop control device (4), the closed-loop control device searching for a minimum of the BVI index in an optimization process and, in the case of a temporally persisting minimum, the threshold-value device (3) or the closed-loop control device (4) receiving data from a device (5) for flight state identification and, in the case of a flight state which is not typical of BVI, the closed-loop control derive (4) being deactivated and switched into a stand-by state.

The present invention also provides a device for avoiding a collision of a rotating rotary blade of a rotary-wing aircraft with a blade vortex, for executing the above method, in which a signal processing device (1) controls a positioning element (6) on the rotor blade and the signal processing device (1) comprises at least one closed-loop control device (4), the closed-loop control device (4) being connected to a threshold-value device (3) and the threshold-value device (3) being connected to a device (2) for identifying BVI, the device (2) for identifying BVI being connected to a rotary-position transducer (12) on the rotor of the rotary-wing aircraft (9) and the closed-loop control device (4) or the threshold-value device (3) being connected to a device (5) for flight state identification.

The signal processing device includes a device for determining a BVI index. In the device for determining a BVI index, the harmonics of the blade repetition frequency are determined from the electrical signals representing the noise signal spectrum. There, a quotient is formed, as a signal characteristic quantity, from the harmonics typical of BVI and from the total harmonics, and a mean value of the quotients is formed. This averaged quotient is the averaged BVI index. This averaged BVI index is supplied as a signal characteristic quantity to a threshold-value device, the threshold-value device signaling, in the case of BVI, an exceeding of the threshold value, which starts the closed-loop control device. In an optimization process, the closed-loop control device searches for a minimum of the BVI index. In the case of a temporally persisting minimum, the threshold-value device or the closed-loop control device receives data from a device for flight state identification and, in the case of a flight state which is not typical of BVI, the closed-loop control device is deactivated and switched into a stand-by state.

In the device for determining BVI, the measured pressure signal is synthetically replicated, by means of an iteratively executed minimization algorithm, from the time-pressure spectrum acquired by the sound-pressure sensors at a sampling instant.

In the device for determining BVI, the harmonics of the blade repetition frequency are determined from the pressure signal replicated at a sampling instant and the blade repetition frequency is supplied by a rotary-position transducer on the rotor of the rotary-wing aircraft to the device for determining BVI.

In the device for determining BVI, the harmonics typical of BVI are determined from a characteristic frequency range.

The BVI index is determined from the harmonics typical of BVI and the harmonics of the time-pressure spectrum. The BVI index is classified according to its value number.

Formed in respect of individual quotients, in a time domain, is a mean value of the BVI index which is transmitted, as a signal characteristic quantity, to the threshold-value device. The threshold-value device has at least one threshold value for identification of BVI and a threshold which, following attainment of the minimum of the BVI index, signals a renewed increase in BVI.

The closed-loop control is a threshold-value-based closed-loop control, the closed-loop control device including an optimization process.

The facility for executing the method comprises a signal processing device which controls a final control element on the individual rotor blade. The closed-loop control affects each rotor blade of the rotary-wing aircraft. The signal processing device comprises at least one closed-loop control device, the closed-loop control device being connected to a threshold-value device and the threshold-value device being connected to a device for forming BVI, and the closed-loop control device or the threshold-value device being connected to a rotary-position transducer of the rotor of the rotary-wing aircraft and the threshold-value device or the closed-loop control device being connected to a device for flight state identification.

The invention succeeds in rapidly and precisely finding the frequency content from the signal of the sound-pressure sensors. The harmonics are progressively adapted. The method operates only by means of continuous, point-by-point signal sampling. The invention provides for scope in the step selection, in order to identify and take account of variations of the blade repetition frequencies ($\omega_0$). The method is thus superior to a FFT (Fast Fourier Transformation) analysis, which proceeds in blocks.

Compared with an FFT analysis, the invention provides the advantage of a lesser calculation requirement per step, while nevertheless providing an increased frequency accuracy.

The invention succeeds in controlling each rotating rotor blade in such a way that it can escape blade vortices and thus avoid a noise-generating interaction with the blade vortices.

BRIEF DESCRIPTION OF THE DRAWING

The present invention is explained more fully in the following with reference to an embodiment example and a corresponding drawing, in which.

DETAILED DESCRIPTION

Figure 1:
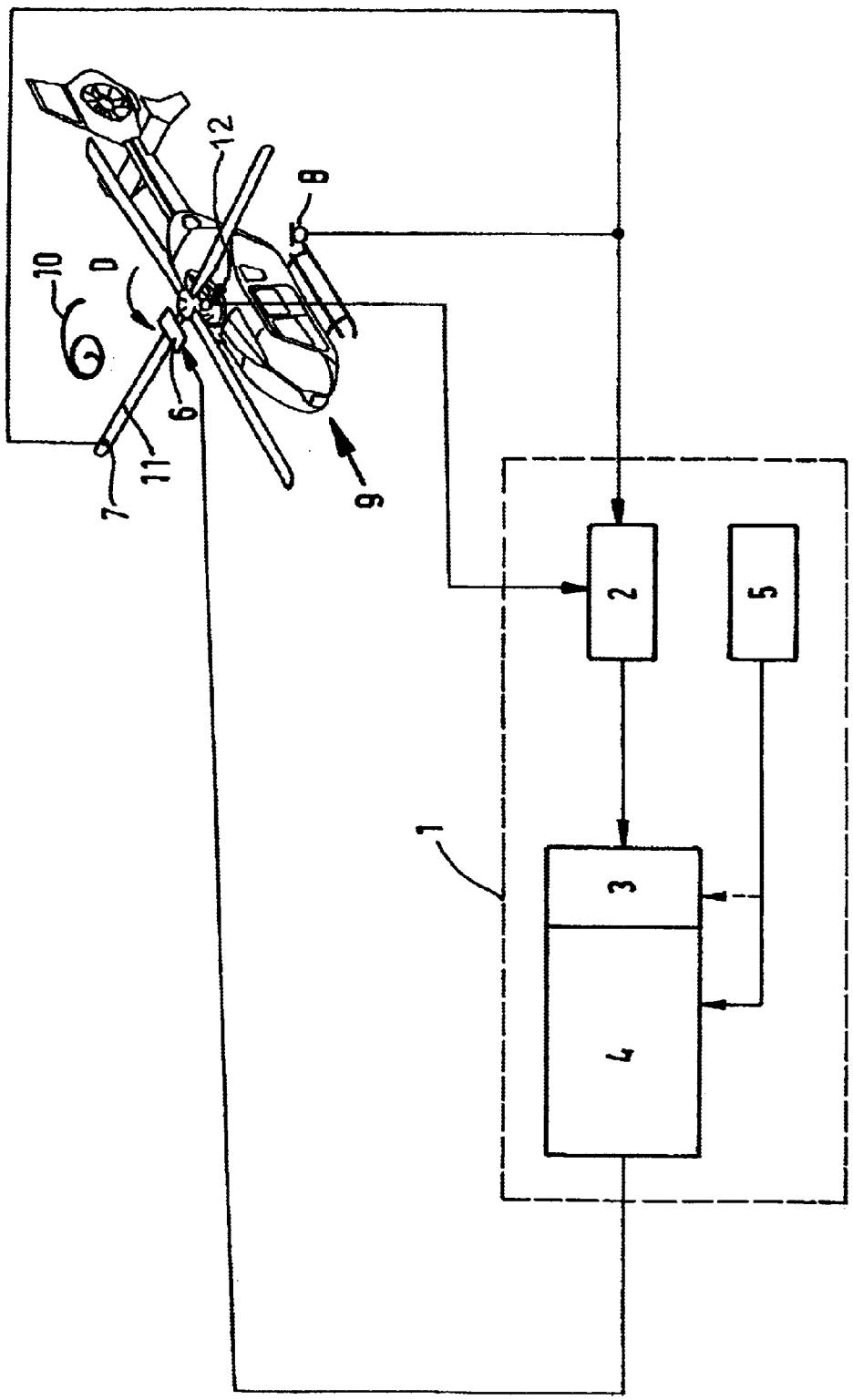
FIG. 1 shows a schematic representation of a helicopter having a signal processing device according to the present invention.

FIG. 1 shows a helicopter 9 with the direction of rotation D of its rotor. A signal processing device 1, by means of a final control element 6 installed on the rotor blade 11, controls the position of the rotor blade in relation to a detected blade vortex 10. This representation applies to all rotor blades.

Used as measuring elements are sound-pressure sensors which can be disposed in the rotating system of a helicopter, the rotor system, or in the fixed system of the helicopter 9, in the region of the outer wall of the fuselage. Sound-pressure sensors 7 in the rotor system can be installed, for example, on the surface of the rotor blade. Sound-pressure sensors 8 in the fixed system of the helicopter 9, for example, in the region of the outer wall of the fuselage, can be microphones which can be installed on the wall or on the landing gear of a helicopter.

Several sound-pressure sensors 7, 8 are advantageously used. The positioning of the sound-pressure sensors is dependent on locations at which the blade vortices occur and the preferred directions of propagation of the blade vortices. BVI can occur, for example, on the leading and trailing blades. This indicates the necessary positioning of sound-pressure sensors, for example, in the fixed system of the helicopter. The use of several sound-pressure sensors permits optimization of the sensitivity of the process of the subsequent signal processing. The BVI zone in respect of the rotor blade plane also shifts, for example, in dependence on the flight state.

The sound-pressure sensors 7, 8 are to be rated so that they can also acquire the frequency range typical of BVI. The variations in pressure acquired by the sound-pressure sensors are converted into electrical signals. In the case of BVI, these electrical signals have an information content which is also characteristic of BVI. These electrical signals obtained from the sound-pressure sensors 7, 8 are supplied to a signal-processing device 1. The signal processing device comprises an analysis device for BVI, i.e., the device 2 for determining BVI. This device 2 is connected to a rotary-position transducer 12 on the rotor of the rotary-wing aircraft and to the measuring elements, the sound-pressure sensors 7, 8. The rotary-position transducer 12 supplies signals relating to the rotor frequency.

In the device 2 for determining BVI, the harmonics of the blade repetition frequency are determined from the time-pressure signal of the sound-pressure sensors 7, 8. The harmonics provide significant differences in the noise signal level between BVI and non-BVI.

The harmonics are determined at each sampling instant, i.e., unipunctually. The determined harmonics are classified according to amplitude and phase.

In the device 2 for determining BVI, the measured pressure signal is synthetically replicated, by means of an iteratively executed minimization algorithm, from the time-pressure spectrum acquired by the sound pressure sensors (7, 8) at a sampling instant.

The harmonics typical of BVI are determined from a characteristic frequency range.

A so-called BVI index is formed from the ratio of the harmonics typical of BVI to the total harmonics of a sampling instant, the amplitudes of the harmonics being considered in this case. The BVI index is a measure of the presence and strength of BVI.

Several values of the BVI index are averaged over a defined period of time. A trend of the BVI is thus obtained, avoiding the situation whereby each individual value for BVI can result in a discrete, individual variation of the actuating quantity. A "jitter" of the actuating action is thus avoided.

The averaged BVI index is supplied, as a signal characteristic quantity, to a threshold-value device 3. The threshold-value device 3 can be a constituent part of the closed-loop control device and can be integrated into the closed-loop control device 4 as, for example, a constituent part of the software. The threshold-value device 3 operates according to the function of a switch. This threshold-value device 3 forms the input for the closed-loop control device 4. Depending on the value of the BVI index, the closed-loop control device 4 effects a threshold-value-based closed-loop control. The attainment of a first threshold value starts the actual closed-loop control device 4.

This first threshold value is exceeded when, as a signal characteristic quantity, BVI is represented in the BVI index. Upon the exceeding of the threshold value, the closed-loop control device 4 is activated by means of the threshold-value device 3. The closed-loop control device 4 executes a minimization algorithm. In this minimization algorithm, a variation of the current BVI index is in relation to a minimum which is dependent on the flight state (ideally BVI index=0). This minimization is effected progressively, through adaptation of amplitude and/or phase, e.g. according to the "golden mean" rule. The minimum is found by means of iteration. In the minimum, the said BVI index consequently goes towards zero.

On the basis of the determined minimum, the closed-loop control device 4 forms an actuating signal which precisely generates the actuating action of a positioning or final control element (actuator) 6 that is necessary to enable the detected blade vortex to be escaped. The closed-loop control device 4 sets the phase angle and/or the amplitude of the actuating signal to be generated. The actuating action can be executed by, for example, piezo-actuators (6) disposed on the rotor blade. These actuators generate a twisting movement of the rotor blade, so that the angle of incidence of the blade is briefly altered and the lift of the blade and its spatial position are altered as a result.

When the closed-loop control device 4 has found the minimum, BVI on the helicopter 9 is substantially reduced.

If, for example, during a descent the flight path is briefly altered to a horizontal flight-path section, then BVI would not occur for this horizontal flight-path section. The closed-loop control device 4 must be capable of identifying this special case of transition from a descent to a horizontal flight, i.e., the closed-loop control device must be able to deactivate itself in the case of a minimum BVI index. For this purpose, a device 5 for flight state identification is also provided. The device 5 for flight state identification holds, stored in memory and ready to be retrieved, data relating to the speed of descent, flight speed, descent angle, etc. These data for flight state identification are continuously supplied to the threshold-value device 3 or the closed-loop control device 4 for analysis. The flight state identification data are used to evaluate the BVI index, so that the threshold-value device 3 or the closed-loop control device identifies which BVI values are to be assigned to a horizontal flight. Upon horizontal flight, the closed-loop control device 4 is deactivated by the threshold-value device 3 and goes into a stand-by state.

If the minimum of the BVI index has been found in a descent, a renewed increase in BVI relative to the found minimum occurs with an alteration of the descent angle of the rotary-wing aircraft. A second threshold, slightly above the first threshold, signals departure from the minimum. Minimization is restarted.

What is claimed is:

1. A method for avoiding a collision of a rotating rotor blade of a rotary-wing aircraft with a blade vortex, the method comprising:

acquiring a noise signal spectrum using a measuring element disposed on the rotary-wing aircraft;

converting the noise signal spectrum into electrical signals and transmitting the electrical signals to a signal processing device;

determining a harmonics value of a blade repetition frequency of the rotor blade from the electrical signals using an analysis device of the signal processing device, determining a blade vortex interference index value by calculating a quotient from a typical blade vortex interference harmonics value and the determined harmonics value;

determining an averaged blade vortex interference index value;

supplying the averaged blade vortex interference index value as a signal characteristic quantity to a threshold-value device;

signaling a blade vortex interference using the threshold-value device when the averaged blade vortex interference index value exceeds a first threshold value;

upon the signaling of the blade vortex interference, determining a minimum of the blade vortex interference index value by an optimization process using a closed-loop control device;

upon a determining of a temporally persisting minimum, providing flight state identification data from a flight state identification device to at least one of the threshold value device and the closed loop device;

deactivating the closed-loop control device and switching the closed-loop control device to a stand-by state when the flight state identification data shows a flight state not typical of blade vortex interference; and generating an actuating signal for a final control element disposed on the rotor blade so as to influence an aerodynamic parameter of the rotor blade.

2. The method as recited in claim 1 wherein the acquiring of the noise signal spectrum includes acquiring a time-pressure spectrum from a plurality of sound-pressure sensors at a sampling instant, the electrical signals including a pressure signal, and further comprising synthetically replicating the pressure signal in the analysis device using an iteratively executed minimization algorithm.

3. The method as recited in claim 2 wherein the determining of the harmonics is performed using the replicated pressure signal and wherein the blade repetition frequency is supplied to the analysis device from a rotary position sensor disposed on the rotor of the rotary-wing aircraft.

4. The method as recited in claim 3 further comprising determining the typical blade vortex interference harmonics value from a characteristic frequency range using the analysis device.

5. The method as recited in claim 4 further wherein the determining of the blade vortex interference index value includes classifying a value number of the quotient as the blade vortex interference index value.

6. The method as recited in claim 2 wherein the determined harmonics value includes the harmonics value of the time-pressure spectrum.

7. The method as recited in claim 6 wherein the determining of the averaged blade vortex interference index value includes averaging a plurality of individual quotients in a time domain.

8. The method as recited in claim 1 further comprising, after the determining of a temporally persisting minimum, signaling a renewed increase in blade vortex interference using the threshold-value device when the a subsequent averaged blade vortex interference index value exceeds a second threshold value.

9. The method as recited in claim 1 wherein the closed-loop control device effects a threshold-value-based closed-loop control and the closed-loop control device includes an optimization process.

10. A device for avoiding a collision of a rotating rotor blade of a rotary-wing aircraft with a blade vortex, the device comprising:

a signal processing device for controlling a positioning element disposed on the rotor blade, the signal processing device including a closed-loop control device, a threshold-value device, an analysis device for identifying blade vortex interference, and a flight state identification device, wherein the closed-loop control device is connected to the threshold-value device, the threshold-value device is connected to the analysis device, and the flight state identification device is connected to at least one of the closed-loop control device and the threshold value device; and a rotary-position transducer disposed on a rotor of the rotary-wing aircraft and connected to the analysis device.

* * * * *